(12) United States Patent
Brandstrom

(10) Patent No.: US 9,206,939 B2
(45) Date of Patent: Dec. 8, 2015

(54) MOUNTING BRACKET FOR FRAME ASSEMBLY AND METHOD OF USE

(75) Inventor: Karl Peter Brandstrom, Salisbury, MD (US)

(73) Assignee: Bergvik North America, Inc., Salisbury, MD (US)

( * ) Notice: Subject to any disclaimer, the term of this patent is extended or adjusted under 35 U.S.C. 154(b) by 135 days.

(21) Appl. No.: 13/546,650

(22) Filed: Jul. 11, 2012

(65) Prior Publication Data

US 2014/0014608 A1   Jan. 16, 2014

(51) Int. Cl.
| | | |
|---|---|---|
| A47B 57/00 | (2006.01) | |
| F16M 1/00 | (2006.01) | |
| F16B 12/44 | (2006.01) | |
| F16M 7/00 | (2006.01) | |

(52) U.S. Cl.
CPC ............... *F16M 1/00* (2013.01); *F16B 12/44* (2013.01); *F16M 7/00* (2013.01); *F16B 2012/446* (2013.01); *Y10T 29/49826* (2015.01); *Y10T 403/42* (2015.01)

(58) Field of Classification Search
CPC ............ F16M 1/00; F16M 7/00; F16B 12/44; F16B 2012/446; Y10T 29/49826; Y10T 403/42
USPC ......... 211/207, 189–191, 195, 204, 206, 182; 403/231, DIG. 12, DIG. 13, 217–219, 403/403; 248/188.4, 188; 217/65
See application file for complete search history.

(56) References Cited

U.S. PATENT DOCUMENTS

| | | | | |
|---|---|---|---|---|
| 1,645,421 | A * | 10/1927 | Gloekler ....................... 248/188 |
| 4,077,335 | A * | 3/1978 | Luzzani et al. .................. 108/75 |
| 4,318,628 | A * | 3/1982 | Mancini ........................ 403/231 |
| 4,630,550 | A * | 12/1986 | Weitzman ..................... 108/155 |
| 4,885,883 | A * | 12/1989 | Wright ............................ 52/280 |
| 5,203,039 | A * | 4/1993 | Fredman ........................... 5/203 |
| 5,372,448 | A * | 12/1994 | Gilb ............................. 403/231 |
| 5,425,520 | A * | 6/1995 | Masumoto .................... 248/247 |
| 5,997,117 | A * | 12/1999 | Krietzman ................. 312/265.4 |
| 6,354,231 | B1 * | 3/2002 | Morris ..................... 108/144.11 |
| 2007/0092330 | A1 * | 4/2007 | Zeilinger et al. ............. 403/231 |

* cited by examiner

*Primary Examiner* — Korie H Chan
(74) *Attorney, Agent, or Firm* — Morgan, Lewis & Bockius LLP

(57) ABSTRACT

A mounting bracket is provided that can be used with off the shelf steel tubing to make sturdy and secure frames securing for heavy equipment to a floor or other structure. Different sizes and shapes of frames are easily made by cutting the steel tubing to different lengths and assembling frames using the cut tubing and brackets. The mounting bracket includes two pairs of sidewalls respectively defining first and second channels set at an angle to one another. The mounting bracket further includes a base protrusion and may be configured such that the first and second channels receive a standard tubular member and the base protrusion fits into an end of the tubular member. The mounting bracket may also include a flange that is integral or part of a mounting bracket assembly.

16 Claims, 2 Drawing Sheets

MOUNTING BRACKET FOR FRAME ASSEMBLY AND METHOD OF USE

FIELD OF THE INVENTION

The present invention relates to a bracket for use with tubular support members to create rigid frame assemblies.

BACKGROUND OF THE INVENTION

Various heavy equipment that is used in commercial buildings and data centers needs to be securely installed on raised flooring or frames. Examples of such equipment include CRAC (precision air conditioning) units, UPS Racks, Power Distribution Units, transformers, and other heavy equipment. This type of equipment comes in various sizes and dimensions that may be unique to the system, but nonetheless the equipment needs to be supported by a frame and securely attached to the floor. Additionally, there may be seismic and other requirements for the support.

At present, each piece of heavy equipment that is to be installed at a customer site requires a pre-sized and pre-welded frame support structure to be shipped to a customer site for installation. This requires extra storage space to store an assortment of pre welded frames for various pieces of equipment. Additionally, for any given installation, the need for pre-welded frames also results in significant waste and inefficiency due to shipping time and expense.

Accordingly, there is a need for a frame design which is both sturdy and secure and easy to ship. There is a further need for a frame design which can be manufactured or assembled quickly and without adding significant shipping or lead times or expense. There is a further need for a frame system that does not need to be pre-manufactured and stored in various unique sizes and shapes.

SUMMARY OF THE INVENTION

According to the present invention, a mounting bracket is provided that can be used with off the shelf steel tubing to make sturdy and secure frames securing for heavy equipment to a floor or other structure. Different sizes and shapes of frames are easily made by cutting the steel tubing to different lengths and assembling frames using the cut tubing and brackets. The mounting brackets and tube steel can be stored in much less space than pre-welded frames and be assembled when needed. Moreover, if frames need to be provided to a customer site, they can be shipped prior to assembly in a flat pack consisting of the mounting brackets. Alternatively, mounting brackets and tube steel can be stored at the customer site at the beginning of a project and then the tube steel can be cut to the right lengths and used with brackets to implement different size frames as needed. The mounting bracket is configured, when combined with tubular members, to provide structural rigidity in three dimensions and leads to sturdy frames by design. In addition to steel, other materials can be used, such as plastic, to assemble sturdy frames as needed in a variety of sizes for various uses.

According to one embodiment of the invention, a mounting bracket is provided that includes two pairs of sidewalls respectively defining first and second channels set at an angle to one another. The mounting bracket further includes a base protrusion and may be configured such that the first and second channels receive a tubular member and the base protrusion fits into an end of the tubular member. The mounting bracket may also include a flange that is integral or part of a mounting bracket assembly. The flange may include faces that are positioned adjacent to the base protrusion and an inner face of one of the side channels to provide enhanced rigidity. The base protrusion may be positioned substantially under one of the side channels or may be positioned at least partially under the first and second side channels. The tubular members may have a rectangular or round cross section and when assembled with the mounting brackets make a free standing frame with sides and legs. The legs may further include adjustable height portions.

According to another embodiment of the invention, a method of using a mounting bracket to construct a frame includes providing at least three mounting brackets. Each mounting bracket includes a first and a second pair of sidewalls defining first and second channels set at an angle to one another and a base including a base protrusion, wherein the first and second channels are configured to receive a tubular member and the base protrusion is sized to fit into an end of the tubular member. The method further includes cutting at least one tubular member into lengths to construct the sides and legs of a frame using the mounting brackets and positioning the tubular members onto the mounting brackets to create the sides and legs of the frame. The tubular members may be attached to the mounting bracket using any convenient mounting technique, including screws, bolts or adhesives. To construct a rectangular frame, the number of mounting brackets is 4 and the angle is 90 degrees. To construct a five sided frame, the number of mounting brackets is 5 and the angle is 72 degrees.

BRIEF DESCRIPTION OF THE FIGURES

The above described features and advantages of the present invention will be more fully appreciated with reference to the appended figures in which.

DETAILED DESCRIPTION

According to the present invention, a mounting bracket 100 is provided that can be used with off the shelf steel tubing to make sturdy and secure frames 10 for securing heavy equipment to a floor or other structure. Different sizes and shapes of frames are easily made by cutting the steel tubing to different lengths 105, 110 and assembling frames using the cut tubing and brackets 100. The mounting brackets 100 and tube steel can be stored in much less space than pre-welded frames and be assembled when needed. Moreover, if frames need to be provided to a customer site, they can be shipped prior to assembly in a flat pack consisting of the mounting brackets and/or brackets and flat tube steel. Alternatively, mounting brackets and tube steel can be stored at the customer site at the beginning of a project and then the tube steel can be cut to the right lengths and used with brackets to implement different size frames as needed. The mounting bracket 100 is configured to provide structural rigidity in three dimensions and leads to sturdy frames by design. In addition to steel, other materials can be used, such as plastic, to assemble sturdy frames as needed in a variety of sizes for various uses.

Figures 1, 2:
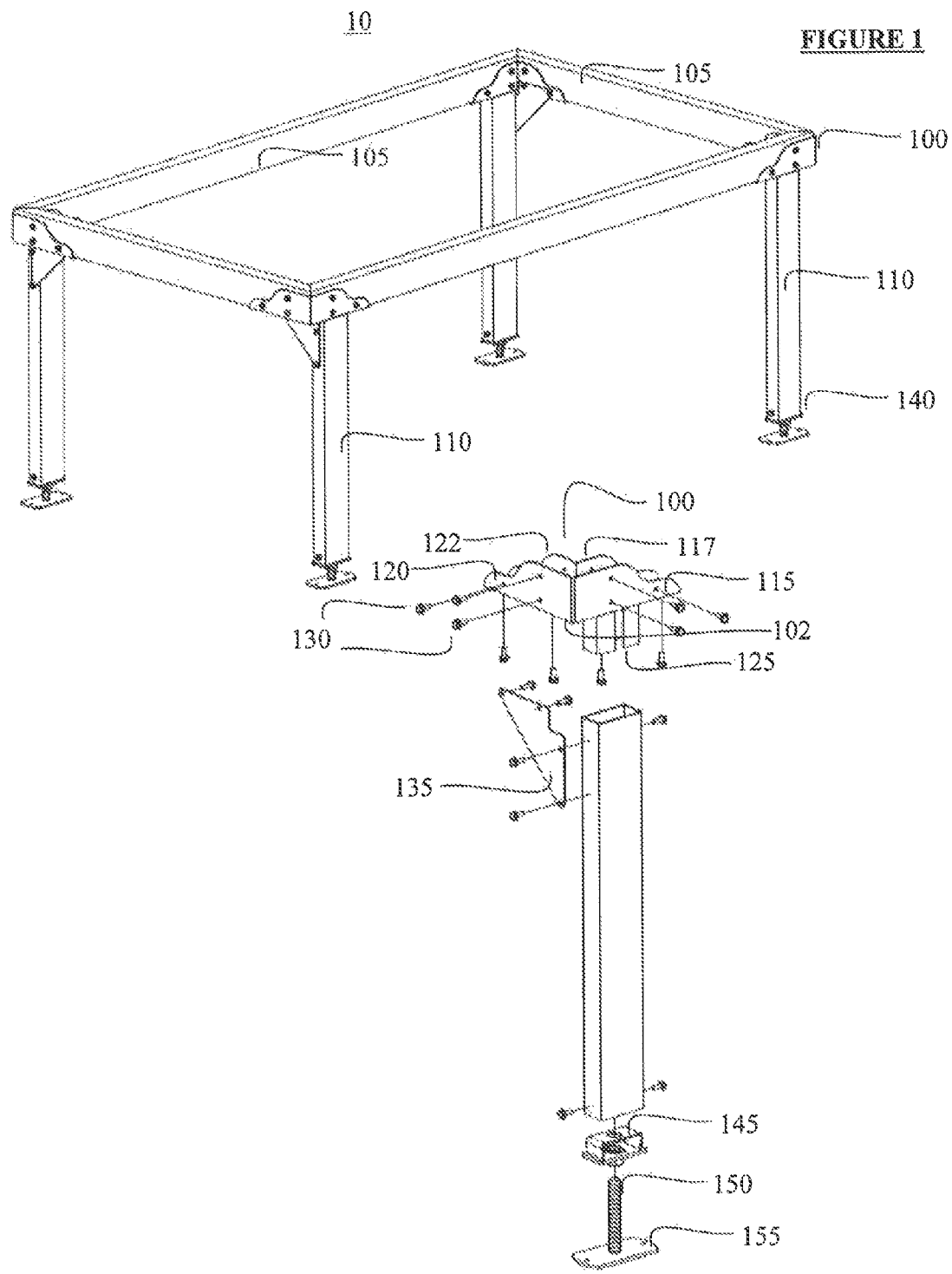
FIG. 1 depicts a frame assembled with mounting brackets and tubular members according to an embodiment of the present invention.
FIG. 2 depicts an exploded view of a mounting bracket and flange and leg made of a tubular member according to an embodiment of the invention.

Referring to FIG. 2, a mounting bracket 100 according to one embodiment of the invention is shown. The mounting bracket is a corner bracket with a first pair of side walls 115, 117 and a second pair of side walls 120, 122, each secured to a base 102. The first pair of side walls and the second pair of side walls each define first and second respective channels that are offset from each other by 90 degrees as shown. It will be understood, however, that the first and second channels may be offset from each other by more or less than 90 degrees. In other configurations where the channels are not perpendicular, the brackets may be used to make frames with more of fewer than four sides.

The base 102 includes a support plate that connects the first and second pair of side walls which may be integral with the bracket 100. The bracket also includes a base protrusion 125 that is sized to fit inside of tubular members 110 that comprise the frame to be made. The base protrusion 125 generally has a shape that fits securely inside of a tubular member. The base protrusion may be positioned underneath either the first or the second channel as shown. Alternatively, the base protrusion may be positioned so that it overlaps the first and second channel. For maximum utility, the base protrusion has an outside side and shape that fits securely inside of a standard size tubular member, such as tubular steel that is generally available. However, it will be understood that any size base protrusion may be implemented and sized to fit inside of a tubular member. Similarly, the first and second side walls should define channels that have a width that is targeted to accommodate the chosen outside width or diameter of the tubular member.

The mounting bracket 100 includes a flange 135 that may be integral or separate. The flange 135 is shown in FIG. 2 to be not integral and include a cut out that allows it to be positioned with an edge of the cutout securely abutting an inside edge of one of the channels, with an inside lower face of the flange adjacent to the base protrusion and an outside upper face adjacent to an inside face of the other one of the channels.

The mounting bracket and flanges may have predrilled holes, as shown, to accommodate screws 130 or bolts. Alternatively, self tapping screws may be used to securely fasten the mounting bracket and flanges to tube steel as shown to make a frame. Generally, screws 130 may be used in the positions indicated and the brackets may be marked to screw locations. Preferably two screws are used on each face for rigidity; however, more or fewer may be used and different positions may be used.

As shown in FIGS. 1 and 2, the legs of the frame 110 are similarly made from tubular members cut to size. The tubular members are fitted over the base protrusion at one end. Screws may then be used to secure the leg to the flange and base protrusion. At the other end of the leg, an adjustable assembly 140 may be provided. The adjustable assembly may include a plug in portion 145 and an adjustable height foot portion 150, 155. The plug in portion plugs snugly into the other end of the tubular member. The plug in portion may further define a threaded hole for receiving a threaded bolt 150 with an attached foot 155 as shown. Other types of adjustable feet may be used on the other end of each leg.

Figure 3:
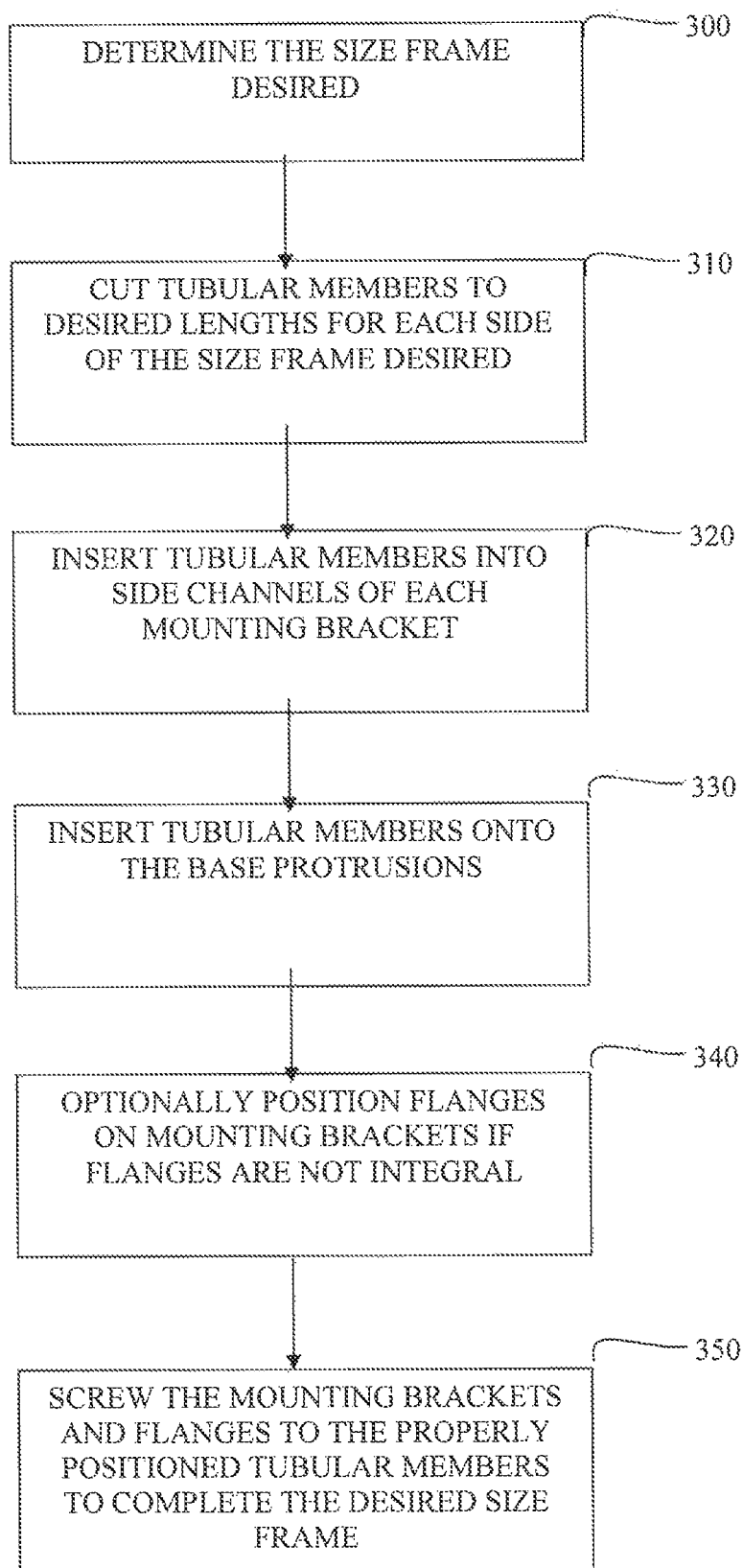
FIG. 3 depicts a method of assembling a secure and sturdy frame of various sizes according to an embodiment of the present invention.

FIG. 3 depicts a method of using the mounting brackets according to an embodiment of the present invention. Referring to FIG. 3, in step 300, a user determines the size of the frame desired. This determination may be made based on the manufacturer's specifications and/or project plans. It may include determining the lengths of each side of the frame and the height of the frame. It may also include determining the type of material required—for example the size or gauge of the tubular member, the material for the tubular member, the size, gauge or material of the mounting brackets and related parts, the fasteners such as screws, bolts, or adhesives. Typical materials include, but are not limited to steel, aluminum, iron, metal alloys, wood or plastics or combinations of the foregoing.

In step 310, the chosen tubular members are cut to the lengths determined in step 300 to construct each side and the legs of the frame desired. In this manner, users can keep brackets in stock and various lengths of standard tube steel or other tubular member, and as needed construct frames of various sizes for supporting heavy equipment or for other uses.

In step 320, the user inserts the tubular members cut for the sizes of the frame into the corresponding side channels of each mounting bracket. For a 90 degree mounting bracket, two side members are inserted into two mounting brackets, and then the other two mounting brackets are used in the corners that do not have brackets. In this manner, four tubular members and four mounting brackets create the rectangular sides of the frame. In step 330, the tubular members for the legs of the frame are inserted onto the base protrusion. In step 340, if the flanges are not integral to the mounting brackets, then the flanges are positioned relative to the legs and the mounting brackets as shown in FIGS. 1 and 2.

In step 350, the mounting brackets and flanges are attached to the tubular members to complete the desired frame in the desired size. The attachment may be accomplished with screws, bolts, adhesives, welding or in any other desired manner.

Each leg may also optionally be provided with extendable feet as shown in FIG. 2. This may be accomplished in any convenient manner, including with the adjustable feet shown and described in connection with FIG. 2.

While specific embodiments of the present invention have been shown and described herein, it will be understood that changes may be made to those embodiments without departing from the spirit and scope of the present invention. For example, the brackets may come in multiple sizes or materials and configurations. The brackets may be for three, four, five or more sized frames with corresponding angles for the side channels. The tubular materials also may be made from any of the materials described herein. Additionally, the maximum efficiency is achieved by using one bracket with a standard size tubular member that is widely available. However, it will be understood that the tubular members may themselves be non-standard or may come in a wide variety of sizes and materials to enable a broad range of uses.

What is claimed is:

1. A mounting bracket assembly, comprising:
   a mounting bracket having a first and a second pair of sidewalls defining first and second channels set at an angle to one another, and the bracket having a base including a base protrusion that extends perpendicular to the first and second channels; and
   three tubular members;
   wherein the first and second channels receive a first and a second one of the tubular members therein and the base protrusion fits securely into an end of a third one of the tubular members; and
   a flange, extending at least from a distal end of the base protrusion to adjacent to the sidewalls, the flange having opposite faces where one of the faces attaches to the third one of the tubular members and the other one of the faces attaches to an inner sidewall of one of the first and second pairs of sidewalls.

2. The mounting bracket assembly according to claim 1, wherein the base protrusion is positioned substantially under one of the first and second channels.

3. The mounting bracket assembly according to claim 1, wherein the base protrusion is positioned at least partially under both side channels.

4. The mounting bracket assembly according to claim 1, wherein the flange is integral with the mounting bracket.

5. The mounting bracket assembly according to claim 1, wherein the tubular members have a rectangular cross section.

6. The mounting bracket assembly according to claim 1, wherein the tubular members have a round cross section.

7. The mounting bracket assembly according to claim 1, wherein the tubular members are standard sized and a plurality of mounting bracket assemblies are joined to construct a free standing frame with sides and legs.

8. The mounting bracket assembly according to claim 6, wherein the third tubular member comprises a leg tubular member having an adjustable height portion, wherein the leg tubular member attaches to the base protrusion.

9. A method of using a mounting bracket to construct a frame, comprising:
   providing at least three mounting brackets that each include a first and a second pair of sidewalls defining first and second channels set at an angle to one another and a base including a base protrusion, wherein the first and second channels receive respective side tubular members therein and the base protrusion fits into an end of a leg tubular member;
   cutting at least one tubular member into lengths to construct sides and legs tubular members for a frame using the mounting brackets; and
   positioning the side and leg tubular members onto the mounting brackets to create the sides and legs of the frame; and
   positioning at least three flanges to respective corresponding ones of the mounting brackets, each flange extending at least from a distal end of the corresponding base protrusion to adjacent to the corresponding sidewalls, each of the flange having opposite faces where one of the faces attaches to the corresponding leg of the frame and the other one of the faces attaches to a corresponding inner sidewall of one of the first and second pairs of sidewalls.

10. The method according to claim 9, further comprising: attaching the side and leg tubular members to the mounting brackets.

11. The method according to claim 10, in which the attachment is performed using screws.

12. The method according to claim 9, wherein the number of mounting brackets is 4 and the angle is 90 degrees.

13. The method according to claim 12, wherein the number of mounting brackets is 5 and the angle is 72 degrees.

14. The method according to claim 9, wherein the tubular member is a standard, widely available tubular member.

15. The method according to claim 9, wherein the tubular member has a rectangular cross section.

16. The method according to claim 9, wherein the tubular member has a round cross section.

\* \* \* \* \*